Patented Oct. 27, 1942

2,299,755

UNITED STATES PATENT OFFICE 2,299,755

PRODUCT FROM PETROLEUM AND PROCESS FOR PRODUCING SAME

Samuel Edward Jolly, Prospect Park, Pa., assignor to Sun Oil Company, Philadelphia, Pa., a corporation of New Jersey No Drawing. Application October 11, 1939, Serial No. 298,980

10 Claims. (Cl. 252—51)

My invention relates to lubricating oils and greases and comprises such an oil or grease to which has been added a halogenated nitrile or a halogenated nitrile-hydrocarbon mixture derived from paraffin wax or from a mixture of paraffin wax and its oxidation products. By the term "paraffin wax" I mean to include slack wax, scale wax, or other high molecular weight aliphatic hydrocarbons. My invention also comprises such products, which are useful for purposes other than as addition agents to lubricating oils and greases. Such products are viscous oils, soluble in hydrocarbons in all proportions, having particular value as addition agents to lubricating oils intended for use under severe operating conditions, such as in hypoid gears. The difficulty with which such nitriles are hydrolized makes them especially valuable as lubricants, as they do not readily form corrosive products as do the esters of the fatty acids. Owing to their stability against hydrolysis they may be added to greases without substantially altering the alkalinity of the grease.

The process of producing these products and the lubricating oil to which they are added will first be described as applied to a mixture of unoxidized wax and oxidation products obtained by passing an oxygen-containing gas through paraffin wax until a product having the desired saponification value is obtained. These oxidation products are composed of acids, esters, alcohols, and other intermediate oxidation products and should have a saponification value of at least 120, the nitriles being formed therefrom by treatment with ammonia, under conditions hereinafter described.

The mixture of unoxidized wax and oxidation products is delivered to a reaction vessel made of glass, stainless steel, enameled-lined metal or any other material that will not be attacked by the products to be reacted. Preferably the vessel is provided with a long narrow neck or cylinder in order to provide for expansion and particularly to afford a longer period of contact between the gas and the liquid. At the top of the neck or cylinder provision is made for condensing and collecting the water that, in the reaction hereinafter described, is split off, as well as any other material that is volatile or is carried over by entrainment. A convenient arrangement includes a condenser provided with a water jacket.

After the reaction vessel is loaded with the mixture it is heated until a temperature of from 200° C. to 450° C. (about 400° C. is the preferred maximum temperature), and ammonia is introduced at the bottom of the reaction chamber, preferably in a finely divided state, as, for example, through a tube provided with a diffusion plate; or a rotating stirrer, such as a "turbomixer," may be used.

The ammonia is passed into the mixture until water is no longer formed. The water is separated and the organic material returned to the reaction chamber.

The reaction may be carried on at atmospheric pressure, but if the boiling point of the starting material is below the desired reaction temperature, a higher pressure is desirable. A pressure of about 75 lbs. per square inch is sufficient in most cases. The reaction may be carried out in the presence of dehydrating catalysts such as silica gel, alumina, thorium oxide, or like substances.

The above process is essentially the same as that described in Patent No. 2,234,915, issued March 11, 1931, on an application filed by me October 11, 1939, Serial No. 298,979, for producing nitriles from petroleum acids or from a mixture of petroleum acids and hydrocarbons. However, the presence of lower molecular weight acids than are present in the petroleum acids makes it necessary or advisable to employ slightly higher temperatures than is necessary when treating petroleum acids. Instead of utilizing, as a starting material, a mixture of unoxidized hydrocarbons and oxidation products of paraffin, purified acids obtained from the oxidation products of paraffin may be employed.

Instead of first passing an oxygen-containing gas through paraffin wax and then subjecting it to the action of ammonia as above described, I prefer to proceed by passing air, or other oxygen-containing gas, and ammonia through molten paraffin wax, thus forming, in turn, the acids, the ammonium salt of the acids and, by splitting off water from the ammonium salt of the acids, the amides, and finally the nitriles. This operation may be effected in the apparatus above described. Molten paraffin wax is admitted to the reaction vessel and heated to a temperature of from 120° C. to 250° C. A temperature of about 160° C. is preferred. Air and ammonia are introduced, at the bottom, simultaneously; or the ammonia may not be introduced until the induction period of the hydrocarbon is passed or until oxygen-containing products are formed. If desired, the reation may be carried out in the presence of catalysts such as suspended metal oxides, or dissolved or suspended salts of organic acids. The process is continued until the hydrolyzed ammonia derivatives of the oxidation products have a saponification value of about 120. As an alternative procedure, the reaction is continued until the product has reached a desired solubility in certain solvents, which dissolve the reaction products, but not the unreacted hydrocarbons such as the lower aliphatic alcohols, ketones, etc. The passage of air is then discontinued and the temperature is raised from the temperature of the oxidation to not above about 450° C., preferably to about 400° C., in the presence of ammonia, until the conversion of the ammonia derivatives formed at the lower temperatures into nitriles is complete. This is evidenced by the fact that water is no longer formed. The reactions which occur are as follows:

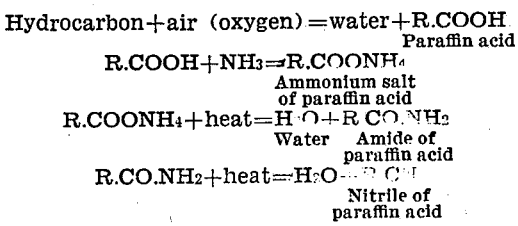

The nitriles may be extracted with suitable solvents and the unoxidized hydrocarbon subjected to further oxidation. The purified nitriles may be halogenated, or they may be hydrolyzed to acids which do not have an appreciable ester value.

The nitriles or the mixture of nitriles and hydrocarbons are dissolved in a suitable inert solvent such as carbon tetrachloride and chlorine passed through the material until the desired amount of chlorine is taken up. The reaction vessel may be of essentially the same type as that used for the preparation of the nitriles. The chlorine is introduced at the bottom of the reaction vessel in a fine state of subdivision, so that the reaction takes place rapidly. This may be done by a diffusor or a stirring device such as a "turbo mixer." The temperature of the reaction mixture is kept below about 60° C. The use of a solvent is desirable because the chlorinated nitriles are very viscous, and it is difficult to get intimate contact between the partially chlorinated nitrile and the chlorine. Any excess chlorine and hydrochloric acid may be removed by blowing the product with air, by heating under a vacuum, by washing with water, or by treating with a neutralizing agent such as quicklime or sodium carbonate. Use of one of the latter two reagents removes some of the loosely bound halogen, and such treatment may be preferred when the product is to be subjected to high temperature conditions. If desired, the product may be treated with decolorizing materials, such as filter clay, to improve the color. Usually it will suffice, after the desired amount of chlorine is introduced into the mixture, to remove the reaction product from the reaction vessel and wash it with water until neutral. The carbon tetrachloride or other solvent is recovered by distillation. The distillation may be conducted under reduced pressure.

The nitriles derived from the oxidation products of paraffin wax are substantially saturated and the chlorine is largely taken up by substitution, hydrogen being split out of the molecule to form hydrogen chloride.

Where an exceptionally high chlorine content is desired, catalysts, such as iodine or iron, should be used.

While it is uneconomical to utilize halogens other than chlorine, it will be understood that nitriles embodying my invention may contain any halogen, namely, fluorine, bromine or iodine.

The amount of chlorine that may be introduced into the nitriles may vary from 5 to 50%, although it is rarely that it is desirable, for any purpose, for the nitrile to contain less than 10% or more than 45%.

The chlorinated nitrile may be added to lubricating oils in amounts varying from .1% to 25%, the amount introduced depending upon the chlorine content of the nitrile and the purpose for which the lubricant is to be used. If the lubricant is to be used under severe operating conditions, it is desirable to use a greater quantity of a chlorinated nitrile which contains a comparatively small amount of chlorine, such as 10-20%. These compounds are more stable than the chlorinated nitriles containing the maximum amount of chlorine.

In claiming the addition of the chlorinated nitrile to lubricating oil I intend that lubricating oil should have its broader signification and thereby include grease.

I do not herein claim broadly a halogenated nitrile derived from petroleum, nor a halogenated nitrile-hydrocarbon mixture derived from petroleum or specifically such products derived from petroleum acids or from a mixture of petroleum acids and petroleum hydrocarbons, nor do I herein claim a lubricating oil to which such products have been added; these forming subjects matter of the patent hereinbefore mentioned and of an application Serial No. 357,661, filed Sept. 20, 1940, as a continuation or division in part of the application for said patent.

What I claim and desire to protect by Letters Patent is:

1. The herein described process of producing a nitrile from paraffin wax which comprises simultaneously passing an oxygen-containing gas and ammonia through molten paraffin wax, thereby producing paraffin acids, immediately neutralizing such acids to form the ammonium salt of the acids, splitting off water from the ammonium salts, thereby producing the amides and finally the nitriles, and then halogenating the nitriles.

2. The herein described process of improving lubricating oil which comprises passing an oxygen-containing gas and ammonia through molten paraffin wax and thereby forming a nitrile, adding thereto between 5 and 50 per cent of halogen and adding to the lubricating oil a minor percentage of the halogenated nitrile.

3. A lubricating oil to which has been added a minor percentage of a nitrile, derived from paraffin wax and halogenated, containing over 5% and less than 50% of the halogen.

4. A lubricating oil to which has been added a minor percentage of a nitrile, derived from a mixture of unoxidized paraffin wax and its oxidation products and halogenated, containing over 5% and less than 50% of the halogen.

5. A lubricating oil to which has been added a minor percentage of a halogenated nitrile-hydrocarbon mixture derived from paraffin wax, said halogenated mixture containing over 5% and less than 50% of the halogen.

6. A lubricating oil to which has been added a minor percentage of a halogenated nitrile-hydrocarbon mixture derived from a mixture of unoxidized paraffin wax and its oxidation products, said halogenated nitrile-hydrocarbon mixture containing over 5% and less than 50% of the halogen.

7. A nitrile derived from paraffin wax to which has been added between 5 and 50 per cent. of a halogen and which is completely soluble in lubricating oil and when added thereto in small proportions has the property of adapting it for use under the severe operating conditions to which lubricants for hypoid gears are subjected.

8. A nitrile derived from a mixture of paraffin wax and its oxidation products to which has been added between 5 and 50 per cent. of a halogen and which is completely soluble in lubricating oil and when added thereto in small proportions has the property of adapting it for use under the severe operating conditions to which lubricants for hypoid gears are subjected.

9. A nitrile-hydrocarbon mixture derived from paraffin wax to which has been added between 5 and 50 per cent. of a halogen and which is completely soluble in lubricating oil and when added thereto in small proportions has the property of adapting it for use under the severe operating conditions to which lubricants for hypoid gears are subjected.

10. A nitrile-hydrocarbon mixture derived from a mixture of unoxidized paraffin wax and its oxidation products to which has been added between 5 and 50 per cent. of a halogen and which is completely soluble in lubricating oil and when added thereto in small proportions has the property of adapting it for use under the severe operating conditions to which lubricants for hypoid gears are subjected.

SAMUEL EDWARD JOLLY.